(No Model.)
L. B. BABCOCK.
STOP COCK.
No. 251,019. Patented Dec. 20, 1881.
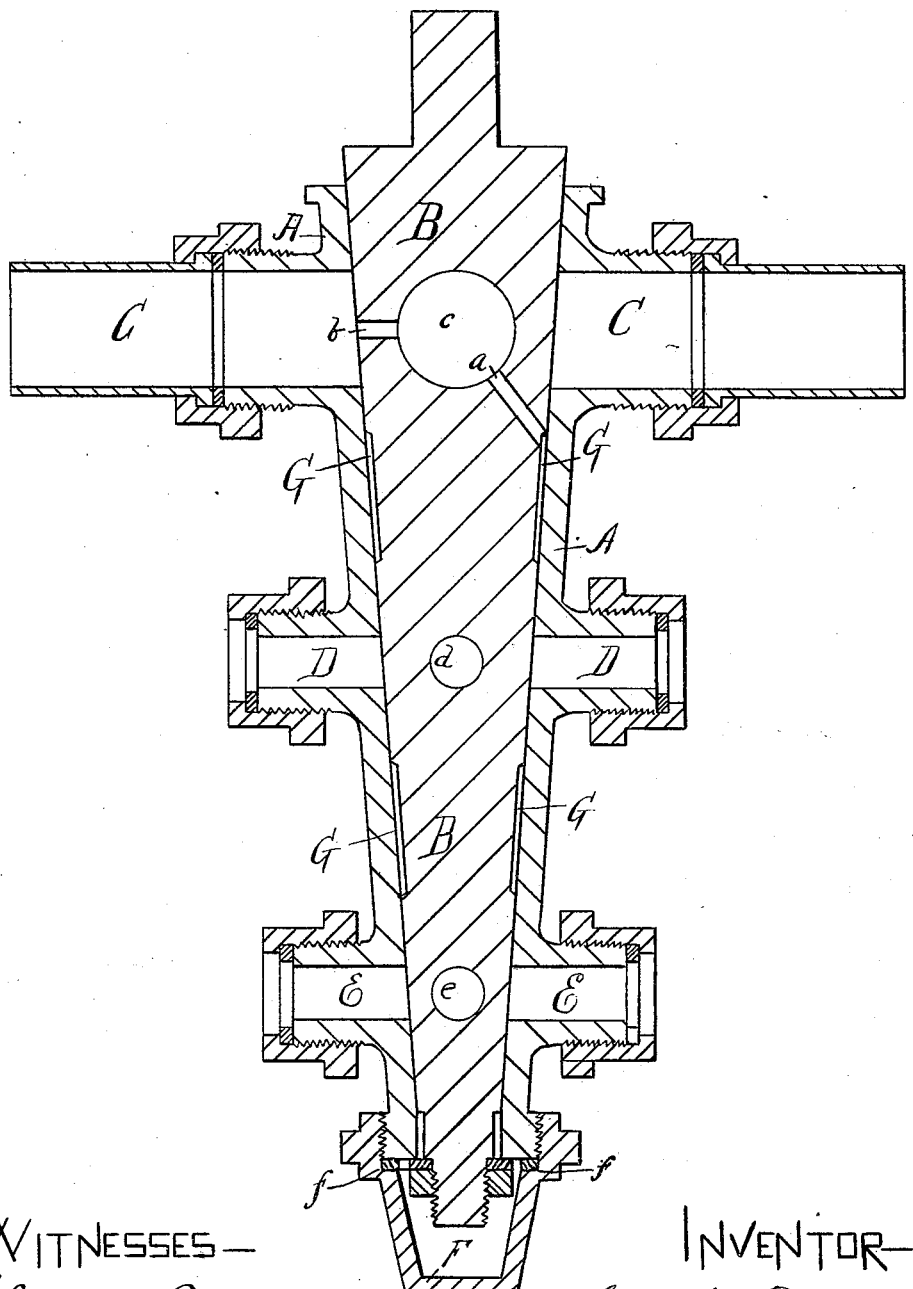
Witnesses—
J. Everett Brown
H. W. Munday.
Inventor—
Linn B. Babcock
by Munday Evarts & Adcock
his attys

UNITED STATES PATENT OFFICE.

LINN B. BABCOCK, OF CHICAGO, ILLINOIS, ASSIGNOR TO EDWIN NORTON AND OLIVER W. NORTON, BOTH OF SAME PLACE.

STOP-COCK.

SPECIFICATION forming part of Letters Patent No. 251,019, dated December 20, 1881.

Application filed August 29, 1881. (No model.)

*To all whom it may concern:*

Be it known that I, LINN B. BABCOCK, of Chicago, county of Cook, and State of Illinois, have invented certain new and useful Improvements in Stop-Cocks, of which the following is a specification.

My invention relates more particularly to improvements in compound stop-cocks in which a single plug or key is employed to shut off two or more pipes. Where one of these pipes is a hot and the other a cold water pipe much difficulty has heretofore been experienced from leakage, owing to one part of the key being expanded by the hot water passing through it, while another part of the key is contracted by the cold water. This difficulty is aggravated by the extremely sensitive nature of brass to different degrees of heat, which is the material of which the stop-cocks are usually made. Besides this, it is sometimes difficult to grind and fit keys of compound stop-cocks so accurately but that some of them will occasionally leak, especially after they become somewhat worn, even where different parts of the key are not subjected to different degrees of temperature. In the present invention I obviate this difficulty by providing the stop-cock with a close cap to prevent leakage at the bottom, and to prevent its leaking at the top I provide a small duct leading from the exterior of the key into the port for the waste-pipe, and another duct through the side of the key, so that any leakage will run off into the waste-pipe.

The accompanying drawing, which forms a part of this specification, is a cross-section of a device embodying my invention.

In said drawing, A represents the shell of the stop-cock, and B the key. C is the waste-pipe; D, the cold-water pipe; E, the hot-water pipe, and *c d e* are the ports for said pipes, respectively. F is a screw-cap secured to the lower end of the shell, and provided with an intermediate gasket, *f*, to secure a perfectly-tight connection, and thereby prevent any leakage from this end of the stop-cock. In order to secure a more accurate fit, the portion of the key between the pipes is made slightly smaller, as shown at G G.

*a* is a small duct extending through the key into the port for the waste-pipe, and *b* is a similar duct leading therefrom into the waste-pipe, so that any leakage-water from the pipes below may run directly into the waste-pipe. I prefer to lead the duct *a* out at the smaller portion G of the key, as the water will naturally collect there between the key and the shell.

My invention is specially adapted for use in houses for preventing leakage of stop-cocks used for simultaneously closing the waste and hot and cold water pipes of wash-stands, sinks, &c.

My invention may be used with stop-cocks having two or any greater number of ports.

Instead of employing two ducts, as shown, it is obvious that one duct might be used, leading directly through the key from the portion G into the waste-pipe. I however prefer the construction shown.

I claim—

1. The compound stop-cock having two or more ports adapted to be closed at once, and provided with drainage ducts leading from the exterior conical surface of the key through the same into the waste-pipe, when the ports are closed, for the purpose of carrying off leakage collected between the shell and key, substantially as specified.

2. The combination, with the shell, of the key having two or more ports arranged to be simultaneously closed, and provided with drainage ducts leading from the exterior conical surface of the key through the same into the waste-pipe, when the ports are closed, to carry off leakage collected between the key and shell, and the tight cap secured to the end of the shell to prevent leakage therefrom, substantially as specified.

LINN B. BABCOCK.

Witnesses:
FRANKLIN FERRISS,
WM. CHAS. SCHUTZ.